United States Patent [19]

Evans et al.

[11] 3,776,150

[45] Dec. 4, 1973

[54] FLUIDIZED BED SYSTEM FOR SOLID WASTES

[75] Inventors: Paul R. Evans, Fort Ashby, W. Va.; Donald H. Graham, Salt Lake City, Utah

[73] Assignee: AWT Systems, Inc., Wilmington, Del.

[22] Filed: Mar. 6, 1972

[21] Appl. No.: 231,982

[52] U.S. Cl. .................................. 110/8 R, 110/28 J
[51] Int. Cl. .............................................. F23g 5/00
[58] Field of Search ........................... 110/8 R, 28 J; 34/57 R, 57 A

[56] References Cited
UNITED STATES PATENTS

| | | | |
|---|---|---|---|
| 3,596,614 | 8/1971 | Smith et al. | 110/8 |
| 3,417,978 | 12/1968 | Suzukawa et al. | 34/57 X |
| 3,397,657 | 8/1968 | Tada | 110/8 |
| 3,361,539 | 1/1968 | Pyzel | 34/57 X |
| 3,306,236 | 2/1967 | Campbell | 110/8 |

*Primary Examiner*—Kenneth W. Sprague
*Attorney*—Finnegan, Henderson & Farabow

[57] ABSTRACT

A fluidized bed system for pyrolysis or incineration of solid wastes is provided. The solids feed is force fed to a fluidized bed apparatus having a conically shaped distributor plate and a first internal chamber above the distributor plate and a smaller second internal chamber connected to the first chamber and positioned directly below the first chamber. Solid waste is fed into the apparatus by a feeder which seals the feeder from the apparatus at a point spaced from hot-zone of the apparatus. The system has fluidizing gas inlets which are designed so that fluidized bed in the first internal chamber is more highly fluidized than the fluidized bed in the second internal chamber. A lock in the second internal chamber permits removal of non-reacted materials without interruption in operation of the system.

13 Claims, 4 Drawing Figures

FLUIDIZED BED SYSTEM FOR SOLID WASTES

This invention relates to a system for reclamation of valuable products from solid waste employing a fluidized bed reactor. In another aspect this invention relates to pyrolysis of solid waste in a fluidized bed reactor system. In still another aspect, this invention relates to incineration of solid waste in a fluidized bed reactor system.

Disposal of solid wastes is becoming an increasingly critical problem. Efforts are being made to develop equipment and processes for disposal of solid wastes and preferably for reclamation of valuable products from solid wastes.

Fluidized bed technology is well known. Advantages of fluidized bed systems include the high heat transfer rates provided by these systems and high volumetric heat generation which permits equipment of high capacity to be designed of comparatively compact size. Fluidized bed incinerators are in current use for incineration of municipal sewage sludge.

Solid waste feeds to be pyrolyzed or to be incinerated almost always contain non-combustible solid waste materials which can neither be pyrolyzed nor incinerated. This solid waste material comprised of glass, metals and stones is not or cannot be completely removed economically from solid waste. Such non-combustible solids cause operational problems in fluidized bed systems because of the difficulty in removal of the solids during operation of the system. Such solids build up in the system, plugging orifices and generally reducing the efficiency of the system.

In accordance with this invention, a fluidized bed system for reaction of solid wastes containing an admixture of combustible and non-combustible solid waste matrils is provided which system substantially eliminates the problems associated with prior art fluidized bed pyrolysis or incineration systems heretofore described. The fluidized bed system of this invention comprises in combination: (a) a vertically disposed closed reactor having a first internal chamber adapted to contain a highly fluidized bed of inert fluidized solids, a second internal chamber directly below and in communication with the first internal chamber for containing a moderately fluidized bed of inert fluidized solids; (b) a distributor plate interposed between and connecting the first and second internal chambers, said distributor plate supporting a bed of inert solids in the first internal chamber, said distributor plate having side walls sloping downwardly from the periphery of the first internal chamber toward the center of said first chamber, said distributor plate and the second internal chamber having a multiplicity of fluidizing gas passages therethrough; (c) means for providing fluidizing gas to the gas passages in the distributor plate and second internal chamber to effect a highly fluidized bed in the first internal chamber and a moderately fluidized bed in the second internal chamber; (d) means for heating the fluidized bed; (e) feed means for suppying solid waste feed to the first internal chamber, said feed means having a seal means spaced from the exterior surface of the reactor for preventing fluidizing gas escaping through the feed means from the reactor; and (f) means within the second internal chamber for permitting removal of unreacted solids from the second internal chamber without interrupting operation of said system.

The fluidized bed reactor system of this invention is more fully described with reference to the following detailed drawings and description. In the drawings, like numbers refer to like parts where applicable.

Figure 1:
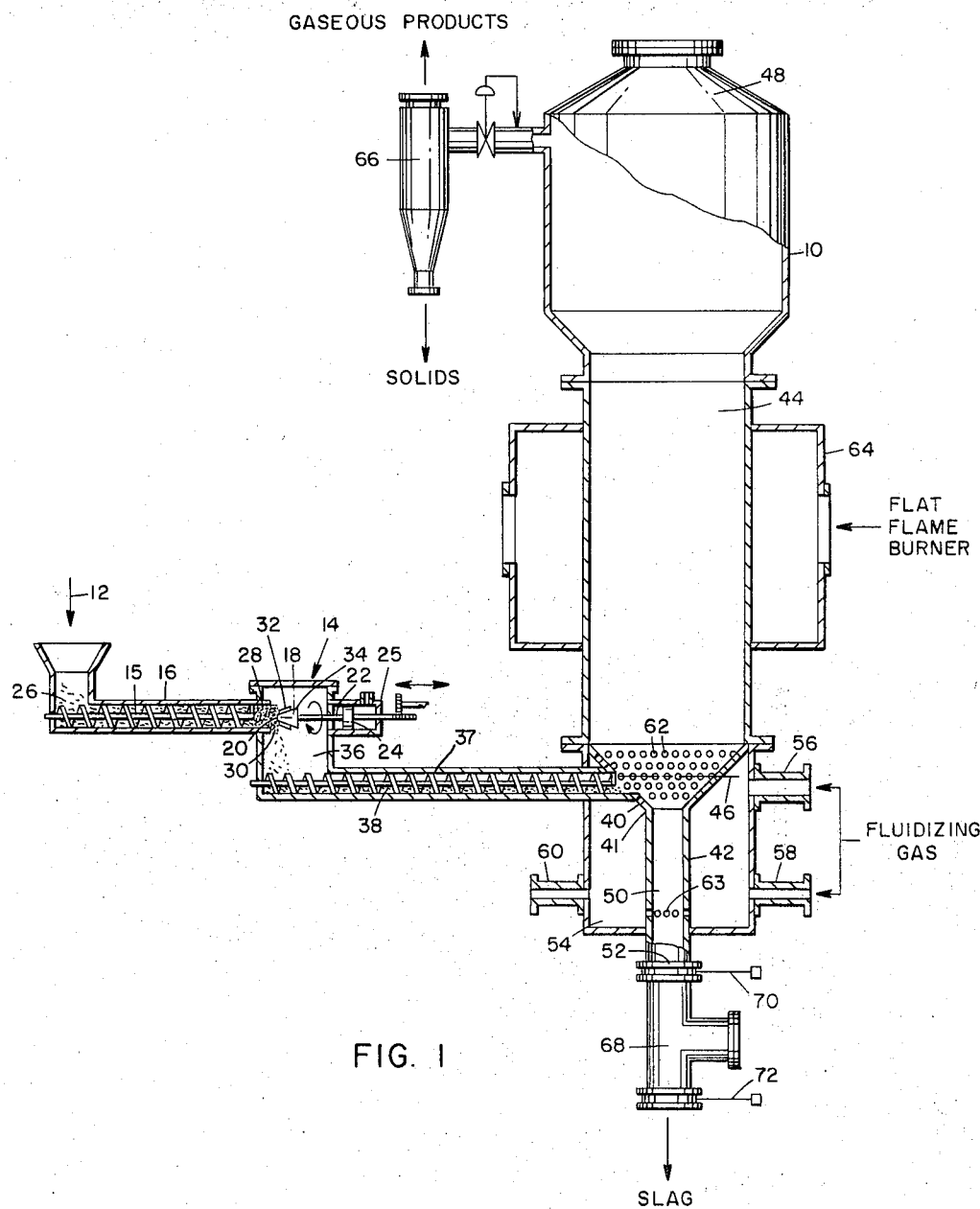
FIG. 1 is a schematic view of the pyrolysis system, partly in section and partly broken away.

In FIG. 1 a vertically disposed closed reactor 10 employed for pyrolysis or incineration is shown. The reactor is fed with a solid waste feed 12 by a solids feed device 14. A first screw conveyor 15 is mounted for rotation within first conveyor housing 16. Conveyor 15 does not extend the full length of conveyor housing 16 in order to provide for an extrusion zone at the discharge-end of the conveyor. The conveyor extrudes solid waste feed 12 against a ram 18. Ram 18 comprises in combination a ram face 20, a rod 22, and piston 24. Ram 18 is mounted for reciprocating and rotational movement in cylinder 25. Rotational movement can be provided by any suitable means such as by use of gears and a motor (not shown).

As the solid waste feed 12 is transferred from the inlet-end 26 to the outlet-end 28 of the conveyor housing 16, feed 12 is compressed into a substantially void-free plug 30. The substantially void-free plug 30 is extended from the outlet-end of conveyor housing 16 and functions as a seal to permit the reactor 10 to be operated at elevated pressure. Ram 18 is positioned in axial alignment with feed screw conveyor 15 and is principally designed for rotational movement with respect to its longitudinal axis. Ram face 20 of ram 18 has a cutting means 32 secured along its peripheral surface. The cutting means 32 comprises one or more knife edges so that the rotating ram shears off and breaks up the compacted plug 30 of solid waste being extruded from housing 16 and fed into reactor 10.

If at any time during operation of reactor 10, the void-free plug 30 should fail to provide the necessary seal to maintain the reactor at operating pressure, ram 18 will move forward, in response to a predetermined pressure decrease, toward the outlet-end 28 of conveyor housing 16 to effect a seal between the aft-end 34 of ram face 20 and the outlet-end 28 of conveyor housing 16. Thus, the feeder as described above seals the reactor either with the void-free plug or with the ram which seals the reactor if the void-free plug fails. As is clear from the foregoing description, the seal means is spaced from the exterior surface of the reactor and away from the reactor hot zone.

Solid waste 12 being fed to reactor 10 is conveyed by the first screw conveyor 15 into expansion chamber 36 in which the solid plug is broken up by the rotating ram 18. The solid feed 12 is then conveyed by a second feed screw conveyor 37 mounted for rotation within housing 38 into reactor 10 through an opening in distributor plate 40. While it is generally preferred to have the feed inlet in the side of the distributor plate, the feed inlet can be well above the distributor plate including even at the top of the fluidized bed reactor.

Figure 3:
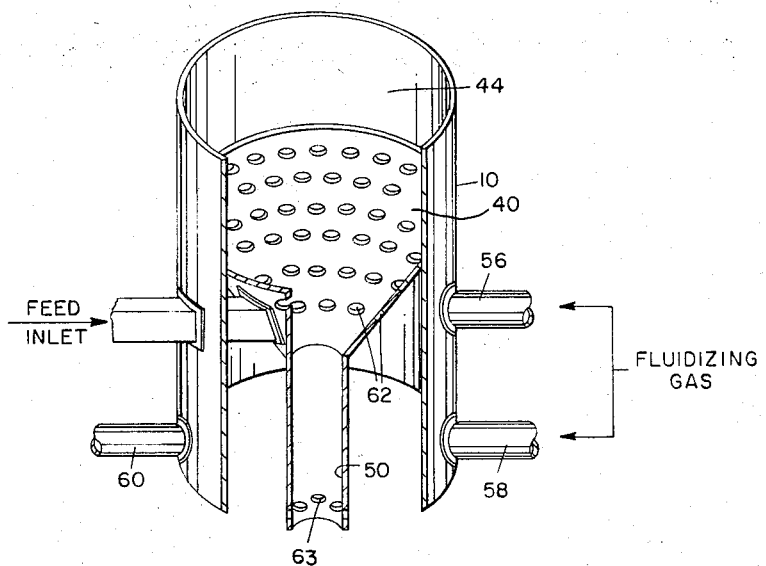
FIG. 3 is a partial elevation, partly broken away further illustrating the configuration of the distributor plate and the second internal chamber of the pyrolysis reactor of FIG. 1.
Figure 2:
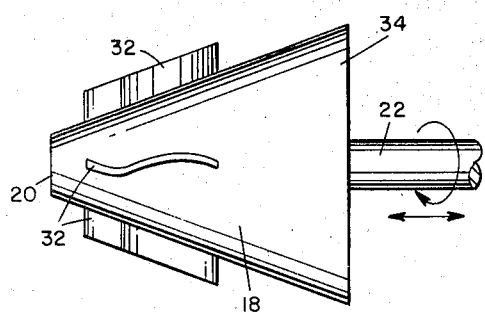
FIG. 2 is a detail view of the ram seal face.

Distributor plate 40 extends downwardly from the periphery of the reactor toward the center thereof, and in the embodiment illustrated has the shape of a truncated cone. Distributor plate 40 merges at its truncated-end 41 in an elongated cylinder or pipe 42 which extends downwardly from said distributor plate and forms the bottom internal portion of reactor 10. Reactor 10 is thus comprised of two internal chambers. The first internal chamber 44 extends from about the center 46 of the conical portion of distributor plate 40 and is defined from the sloping side walls thereof to the top 48 of the reactor 10. The second internal chamber 50 extends from about the center 46 of the conical portion of distributor plate 40 to the bottom 52 of elongated cylinder 42. Distributor plate 40 and second internal chamber 50 are more fully shown in FIG. 3.

Figure 4:
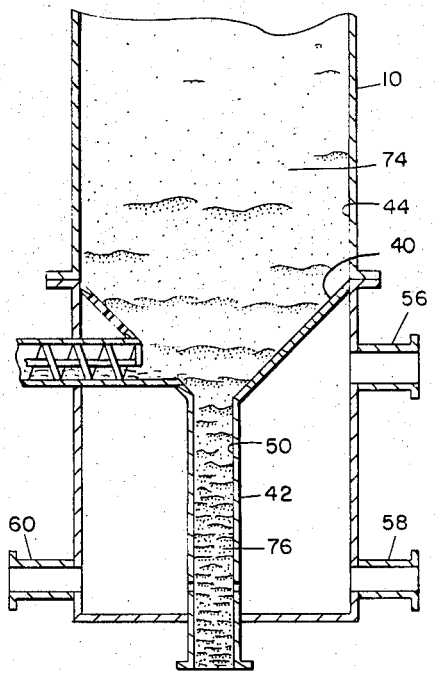
FIG. 4 is a schematic view illustrating the degree of fluidization in the first and second fluidized beds in the pyrolysis reactor of FIG. 1 during operation.

As can be clearly seen from FIGS. 1 and 4, the first internal chamber 44 and the second internal chamber 50 are in communicating relationship. A plenum chamber 54 is positioned directly below distributor plate 40 and has two inlets from the exterior of the reactor 10. Fluidizing gas is introduced into the plenum through inlets 56 and 58. This gas passes through a multiplicity of gas passages or orifices 62 in plate 40 and orifices 63 in pipe 42 which communicatively connect plenum 54 with the first and second internal chambers 44, 50 respectively.

In the reactor illustrated, heat to the first internal chamber 44 of the reactor 10 is provided indirectly employing flat flame burners (not shown). Heat is transferred through the walls of reactor 10 to the fluidized bed within the reactor 10. Heating chamber 64 is formed about the reactor 10 to hold the burner and to aid in distribution of the heat from the burners over a wide area of external surface of reactor 10. Other means of supplying heat to the reactor can be employed such as heating the fluidizing gas and the like. The means chosen will depend primarily on the operation mode in which the system is to be operated, i.e., pyrolysis, partial incineration, incineration.

In FIG. 4 the condition of the fluidized beds 74, 76 in the first and second internal chambers 44, 50 respectively is schematically illustrated. The second fluidized bed 76 in the second internal chamber is only moderately fluidized. The first fluidized bed 74 in the first internal chamber 44 is more highly fluidized. Control of the degree of fluidization in each chamber is principally dependent on the flow of fluidizing gas into each chamber, which is controlled by the size of the gas passageways, the fluidizing gas pressure such as is provided by a suitable pump or compressor, the volume of the chamber through which the fluidizing gas is flowing and the density and particle size of the bed material employed. The degree of fluidization is varied depending on the nature of non-combustible and unreacted solids settling in the second internal chamber.

In operation of the fluidized bed reactor system of this invention, solid waste feed 12 is fed from a feed bin into the first screw conveyor 15 in which it is compressed as heretofore described and then fed by the second conveyor 37 into the fluidized bed reactor. Reactor 10 is preheated (indirectly) by flat flame burners to a temperature of from about 1,000°–1,400°F. For initial start-up it is generally preferred to heat the incoming fluidized gas with a plenum burner 60 (direct heat) to a temperature of from about 1,000° to 1,600°F. Fluidizing gas is fed into plenum chamber 54 and passes through orifices 62 in distributor plate 40 and orifices 63 in cylinder 42. The fludizing gas can be air when operating the reactor system as an incinerator, or a substantially oxygen free gas such as nitrogen, carbon dioxide, or mixture thereof when operating the reactor system in the pyrolysis mode. The system can also be operated with any amount of air or oxygen present in addition to an inert fluidizing gas to operate the system in a partial pyrolysis or incineration mode. During pyrolysis, gases of decomposition can be recovered and recycled as the fluidizing medium. In a pyrolysis operation, decomposition products include light hydrocarbons such as methane, ethane, ethylene, hydrogen and carbon dioxide, and oils and tars. The reactor is operated at a positive or elevated pressure for either pyrolysis or incineration, said pressure generally ranging from about 1 psi to about 10 psi. In an incineration operation, the decomposition products are primarily carbon dioxide and water.

Gaseous products resulting from operation of the fluidized bed reactor as well as elutriated bed material are carried from the top of reactor 10 into a cyclone separator 66 in which the solids are separated from gaseous products. Fluidizing and product gases flow to a gas train for recovery of valuable components, separation, and treatment to prevent air pollution.

Non-combustible materials such as glass, metals and inorganic materials sink into the second fluidized bed. The pressure differential across the second fluidized bed resulting in part from the differences in gas flow through the reactor functions as a driving force for removal of non-combustibles from the second fluidized bed. These materials are emptied from the second fluidized bed by any suitable means. One suitable means for removing the non-combustible materials from the second internal chamber is to employ a lock 68 in the lower portion of the second internal chamber. Non-combustibles and bed material fall into lock 68 when valve 70 is open. Valve 70 is closed periodically and valve 72 is opened for removal of non-combustible and unreacted solids and bed material from the reactor. Operation and functionality of the lock and valves is more fully discussed in a copending application Ser. No. 231,981 of C. S. Miller et al., filed Mar. 6, 1972, reference to which is hereby made. The solids material can be separated into bed materials and other solids, and the bed material reused as needed. Another means which can be employed for removal of the solids collected in the second internal chamber is to employ a high temperature rotary air-lock valve.

In the fluidized bed reactor system of this invention, it is necessary that first internal fluidized bed be highly fluidized to effect high heat transfer from the bed material to the solids feed and to effect high mass transfer rates to remove gaseous products formed from the reacton zone. When the fluidized bed is being operated in the pyrolysis mode in which reaction of the feed is endothermic, it is also necessary to have a fluidized medium with a high heat transfer rate to transfer heat from the heat source into the bed material. The lower fluidized bed must be in direct communication with the upper bed. The driving force compelling glass, metals, other non-combustibles to settle or sink from the upper fluidized bed to the lower fluidized bed is gravity; i.e., these particles have a higher density than the fluidized density of either the upper or lower fluidized beds. The primary advantage in operating the lower fluidized bed at a lower superficial gas velocity is to form a fluid bed which is slightly more dense, making it unlikely that any non-combustible solids entering the lower bed would be tossed back again into the upper bed.

By "moderate" fluidization is meant that the gas flows through the bed material at no more than about 2.0 times minimum fluidization velocity and generally at 1.2–1.5 times minimum fluidization velocity. By "high" fluidization is meant that the gas flows through the bed being fluidized at more than 2.0 times the calculated minimum fluidization velocity. Minimum fluidization velocity, $U_{mf}$ is given by the following equation:

$$U_{mf} = \frac{(\varphi s^{dp})^2 (\rho s - \rho g) \cdot g (\epsilon mf)^3}{150 \quad \mu \quad (1 \epsilon mf)^3} \left(\frac{\text{ft.}}{\text{sec.}}\right)$$

$dp$ = Diameter of bed particle, (ft.)
$\rho g$ = Density of fluidizing a gas, (lb./ft.$^3$)
$s$ = Sphericity of factor
$\mu$ = Viscosity of gas, (lb./ft.–sec.)
$\epsilon mf$ = Voidage at minimum fluidization velocity.

The above equation can be satisfactorily used to describe minimum fluidization velocity for fluidized bed systems in which the Reynolds number of the flowing gas is less than 20. This equation is fully explained in Kunii, D. and Levenspiel, O., FLUIDIZATION ENGINEERING, John Wiley & Sons, 1969.

The fluidized bed material which is employed in the fluidized bed reactor system can be any of the well known solid materials employed for this purpose. Particularly suitable bed materials include sand, carbon and aluminum oxide.

The fluidized bed reactor system of this invention has been described for use as both a pyrolysis system and as an incineration system. The term pyrolysis is used herein to mean thermal decomposition of combustible solids substantially in the absence of oxygen. Incineration, to the contrary, is used herein to mean the combustion of combustible solids in the solid waste feed in the presence of sufficient air to convert the reaction products principally to carbon dioxide and water.

What is claimed is:

1. A fluidized bed system for pyrolysis or incineration of solid waste comprising combustible and non-combustible solids, said system comprising in combination:
   a. a vertically disposed reactor having a first internal chamber adapted to contain a highly fluidized bed of inert fluidized solids;
   b. a distributor plate having a multiplicity of fluidizing gas passages therethrough, said plate supporting the bed of inert solids in the first internal chamber and having side walls sloping downwardly from the periphery of the first internal chamber toward an outlet in the center of said first chamber;
   c. a pipe in communication with the outlet in the distributor plate and extending downwardly therefrom, said pipe forming a second internal chamber directly below and in communiction with the first internal chamber and adapted to contain a moderately fluidized bed of inert fluidized solids, said pipe further having a multiplicity of fluidizing gas passages therethrough that communicate wiht the second internal chamber;
   d. means for providing fluidzing gas to the gas passages in the distributor plate to effect a highly fluidized bed in the first internal chamber and for providing fluidizing gas to the gas passages in the pipe to effect a moderately fluidized bed in the second internal chamber;
   e. means for heating the fluidized bed in said first chamber;
   f. feed means for supplying solid feed waste to the first internal chamber and having seal means for preventing fluidizing gas from escaping through the feed means from the reactor; and
   g. means within the second internal chamber for permitting removal of unreacted solids from the second internal chamber without interrupting operation of said system.

2. The fluidized bed system of claim 1 in which the solids feed enters the first internal chamber at a feed point above the distributor plate.

3. The fluidized bed system of claim 1 in which the solid feed enters the first internal chamber through an opening in the side wall of the distributor plate.

4. The fluidized bed reactor system of claim 1 in which said fluidizing gas is substantially oxygen free, said system being operated to pyrolyze solid waste.

5. The fluidized bed reactor system of claim 1 in which the fluidizing gas is air, said system being operated to incinerate solid waste.

6. The fluidized bed system of claim 1 in which the means for permitting removal of solids from the second internal chamber comprises a lock in said chamber having an entrance side and an exit side, the entrance side of the lock, when open, allowing passage of unreacted solids and bed particles to pass from the second internal chamber to the interior of the lock and there remain while the exit side of the lock is closed and, when said entrance is closed and said exit side is open, to allow the contents of the lock to be discharged therefrom.

7. The fluidized bed system of claim 1 in which the means for providing fluidizing gas to the first and second internal chambers comprises a plenum chamber surrounding the underneath side of the distributor plate and the pipe down to a level beneath the fluidizing gas passages in the pipe and a fluidizing gas inlet for the plenum chamber, the gas passages in said distributor plate being greater in total effective size than the gas passages in the pipe to provide said highly fluidized bed in the first chamber while providing the moderately fluidized bed in the second chamber.

8. A method for operating a fluidized bed system for pyrolysis or incineration of solid waste comprising combustible and non-combustible solids, said method comprising:
   a. feeding the solid wastes to a first internal chamber in a fluidized bed reactor;
   b. passing fluidizing gas upwardly through a distributor plate in the bottom of the first internal chamber at a velocity sufficient to provide a highly fluidized bed of inert fluidized solids in said first chamber, said distributor plate supporting the bed of inert fluidized solids and having side walls sloping downwardly toward an outlet in the center of the first chamber;
   c. heating the fluidized bed in said first chamber;
   d. permitting the heavier non-combustible and unreacted solid residues from the first chamber to fall out through the outlet in the bottom of the distributor plate and into a second internal chamber located directly below and in communication with said first internal chamber;

e. passing fluidizing gas into said second chamber at a velocity sufficient to provide only a moderately fluidized bed in the second internal chamber to thereby consolidate and compact the residue while permitting further reaction of unreacted solids in the residue; and f. periodically withdrawing residue from the second internal chamber without interrupting operation of the system.

9. The method of claim 8, in which the velocity of the fluidizing gas passing into the second internal chamber is less than twice the minimum fluidization velocity necessary to fluidize the inert solids and the velocity of the fluidizing gas passing into the first internal chamber is more than twice said minimum fluidization velocity.

10. The method of claim 9, in which the velocity of the fluidizing gas passing into the second internal chamber is between about 1.2 to 1.5 times said minimum fluidzation velocity.

11. The method of claim 8, in which the solid waste is fed to the first internal chamber through an opening in the side wall in the distributor plate.

12. The method of claim 8, in which the fluidizing gas supplied to the system is substantially oxygen free so that the system operates to pyrolyze solid waste.

13. The method of claim 8, in which the fluidizing gas supplied to the system is air so that the system operates to incinerate solid waste.

* * * * *

UNITED STATES PATENT OFFICE
CERTIFICATE OF CORRECTION

Patent No. 3,776,150          Dated December 4, 1973

Inventor(s) Paul R. Evans et al

It is certified that error appears in the above-identified patent and that said Letters Patent are hereby corrected as shown below:

Column 5, delete the equation and lines 16-20, and substitute therefor the following:

$$U_{mf} = \frac{(\phi_s d_p)^2}{150} \cdot \left(\frac{P_s - P_g}{\mu}\right) g \left(\frac{\epsilon_{mf}^3}{1 - \epsilon_{mf}}\right)$$

$U_{mf}$ = minimum fluidization velocity (ft/sec)

$\phi_s$ = sphericity factor (dimensionless)

$d_p$ = diameter of bed particles (ft)

$P_s$ = density of bed solids (lb/ft$^3$)

$P_g$ = density of fluidizing gas (lb/ft$^3$)

$\mu$ = viscosity of gas (lb/ft-sec)

$g$ = acceleration due to gravity (ft/sec$^2$)

$\epsilon_{mf}$ = voidage factor at minimum fluidization velocity (dimensionless).

Signed and sealed this 16th day of April 1974.

(SEAL)
Attest:

EDWARD M. FLETCHER,
Attesting Officer

C. MARSHALL DANN
Commissioner of Patents